Patented June 15, 1926.

1,588,651

UNITED STATES PATENT OFFICE.

HENRY BLUMENBERG, JR., OF LOS ANGELES, CALIFORNIA, ASSIGNOR TO STOCK-HOLDERS SYNDICATE, OF LOS ANGELES, CALIFORNIA, A CORPORATION OF CALIFORNIA.

PROCESS OF TREATING PHOSPHATE MATERIAL.

No Drawing.   Application filed August 7, 1925.   Serial No. 48,877.

My invention relates to a process of treating phosphate material, and has for its object, to provide a process that is simple, efficient and economic, to decompose the phosphate rock to produce a fertilizing material, or if desired, to segregate the chemical compounds composing the final product.

It is an object of this invention to treat phosphate rock with potassium nitrate, ammonium sulphate in the presence of water and sulphur dioxide.

My invention consists in the steps of the process hereinafter described and claimed.

The phosphate rock $Ca_3(PO_4)_2$ is ground to a fineness, preferably exceeding 100 mesh, is then mixed with water, potassium nitrate and ammonium sulphate, and this mixture is then treated with sulphur dioxide, to yield as an end product potassium sulphate, ammonium di-hydrogen phosphate, calcium nitrate and ammonium sulphite, the latter, however, oxidizing rapidly to ammonium sulphate.

The following equation indicates also the relative proportions of the reagents used in this process.

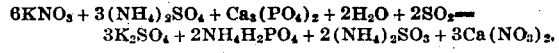
$6KNO_3 + 3(NH_4)_2SO_4 + Ca_3(PO_4)_2 + 2H_2O + 2SO_2 =$
$3K_2SO_4 + 2NH_4H_2PO_4 + 2(NH_4)_2SO_3 + 3Ca(NO_3)_2.$ The reaction will be facilitated by carrying out the process under heat and pressure, 5 to 10 pounds per square inch being a suitable pressure.

The final product is dried and may be used as fertilizer as such, or the different ingredients may be segregated by fractional crystallization or any other suitable method.

In place of potassium nitrate sodium nitrate may be used, yielding in the final product the corresponding sodium sulphate.

Various changes may be made in the steps of the process by those skilled in the art, without departing from the spirit of my invention as claimed.

I claim:

1. A process of treating phosphate material comprising mixing ground phosphate rock with sodium nitrate, ammonium sulphate and water, subjecting the mixture to sulphur dioxide, whereby sodium sulphate, ammonium phosphate, ammonium sulphite and calcium nitrate are formed.

2. A process of treating phosphate material comprising mixing ground phosphate rock with sodium nitrate, ammonium sulphate and water, subjecting the mixture to sulphur dioxide, whereby sodium sulphate, ammonium phosphate, ammonium sulphite and calcium nitrate are formed, under heat and pressure, and drying the mixture.

3. A process of treating phosphate material comprising mixing ground phosphate rock with alkali metal nitrate, ammonium sulphate and water, subjecting the mixture to sulphur dioxide, whereby alkali metal sulphate, ammonium phosphate, ammonium sulphite and calcium nitrate are formed.

In testimony whereof I have signed my name to this specification.

HENRY BLUMENBERG, JR.